Inventor:
Johann-Maria BOYKOW
by Lorke, Kehlenbeck & Farley
Attorneys

June 17, 1930. JOHANN-MARIA BOYKOW 1,764,714
GYROSCOPE
Filed Sept. 28, 1926  2 Sheets-Sheet 2
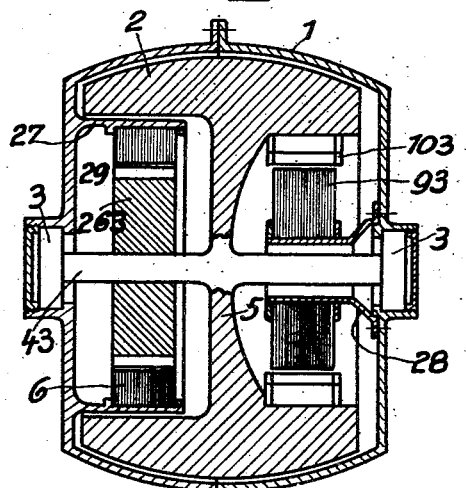
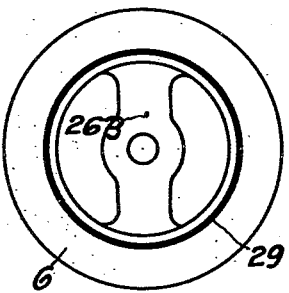
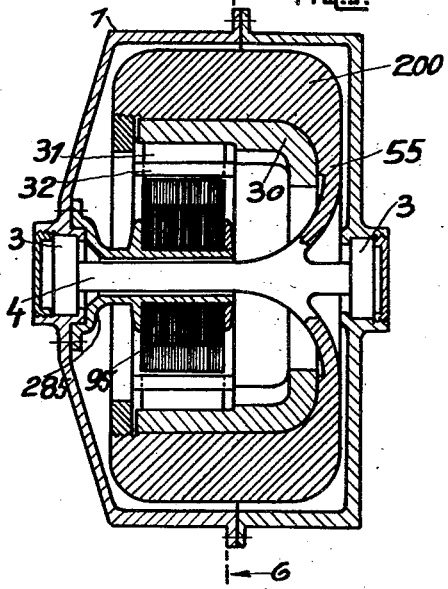
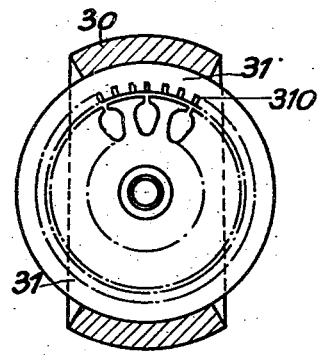
Inventor:
Johann-Maria BOYKOW
By Lorka, Kehlenbeck & Farley
Attorneys Patented June 17, 1930

1,764,714

UNITED STATES PATENT OFFICE

JOHANN-MARIA BOYKOW, OF BERLIN, GERMANY, ASSIGNOR TO THE FIRM MESSGERÄTE BOYKOW, G. M. B. H., OF BERLIN-LICHTERFELDE-WEST, GERMANY

GYROSCOPE

Application filed September 28, 1926, Serial No. 138,158, and in Germany October 3, 1925.

My invention relates to improvements in gyroscopes. In using gyroscopes for technical purposes it is often necessary to know accurately the impulse or thrust of the gyroscope to obtain precise results. For example, gyroscopic apparatus have been described which comprise two oppositely rotating gyroscopes whose impulses or torque are made to be equal.

Up to the present time, there has been no drive for a gyroscope at the disposal of the art which permitted the impulse or torque of a gyroscope to be exactly maintained at a definite value. As now practised, asynchronous motors are used for driving gyroscopes in which the extent of the slip can not be exactly determined so that the difference between the number of revolutions of the gyroscope and that of the rotary field is not accurately known and neither is the angular momentum which is the product of the moment of inertia of the gyrating element and its angular velocity. The object of the improvements is to provide a suitable drive for a gyroscope by means of which the angular momentum is exactly determined. Now, in the gyroscope the moment of inertia is known. Therefore the impulse or torque depends only on the angular velocity, and in order to insure constant or known angular velocity I use a synchronous motor for driving the gyroscope. As is known to those skilled in the art such motors comprise a rotor excited by direct current and a stator having a rotary field produced by alternating current, and the R. P. M. of a gyroscope driven by a motor of this type is always proportional to that of the generator. Another object of the improvements is to reduce the starting period of the gyroscope driven by a synchronous motor, and with this object in view my invention consists in providing a quick-starting asynchronous motor in addition to the synchronous motor, the said asynchronous motor supplying power for starting and the synchronous motor supplying the trifling amount of power required for overcoming resistance while the gyroscope is in full operation.

My invention also relates to the means for supplying current to the rotor of the synchronous motor. In view of the high centrifugal force produced by the high-speed gyrating element, brushes and slip rings are dispensed with and are replaced by contacts, located in the axis of rotation of the said element, and movable relatively to one another. Further, conductors in the form of wires and similar delicate elements are dispensed with, the radial conductors being in the form of rigid rods suitably supported within the gyratory element.

Another object of the improvements is to provide a gyroscope which is simple in construction, and in which more particularly conductors for supplying current to the rotor are dispensed with, and with this object in view my invention consists in providing the said rotor with a permanent magnet or set of permanent magnets, in lieu of the field winding or windings. In order to prevent the reaction of the field of the permanent magnet on the stator, which causes a braking action on the armature and interferes with high velocity, I connect the poles of the permanent magnet by a ring of soft iron.

Finally, in order to relieve the synchronous motor I operate the asynchronous motor at increased frequency. Thus the synchronous motor has merely the function to correct the slip of the asynchronous motor, so that it is itself relieved and more easily maintains its rotation synchronously of its rotary field.

For the purpose of explaining the invention several examples embodying the same have been shown in the accompanying drawings, in which, Fig. 1, is a sectional elevation showing a gyroscope comprising an asynchronous motor and a synchronous motor having a rotor energized by direct current;

Fig. 3, is a similar sectional elevation showing a modification similar to the one shown in Fig. 2 in which the poles of the permanent magnet are connected by a ring of soft iron;

Fig. 4, is an elevation of the permanent magnet shown in Fig. 3 looking from the left in the said figure;

Fig. 5, is a sectional elevation illustrating a modification similar to the one shown in Fig. 3 in which however the driving motors are located one beside the other, and Fig. 6, is a detail sectional view taken on the line 6—6 of Fig. 5.

Figure 1:
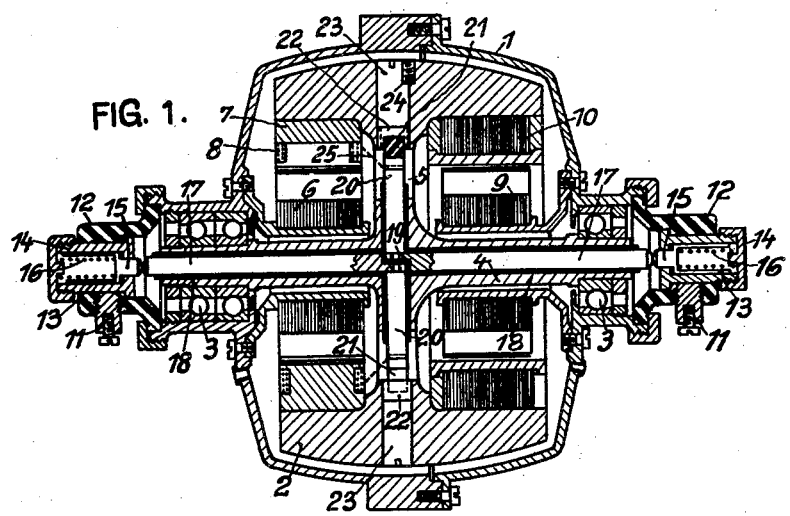

In the example shown in Fig. 1, the gyrating element of the gyroscope is mounted in the casing 1 in the customary way with the aid of ball bearings 3. The gyrating element is in the shape of a double T and its spindle 4 is drilled. Reference is made to this later. A recess or space is on either side of the central web or partition 5. The synchronous motor is in the recess on the left-hand side of the drawing, the asynchronous motor being in the recess on the right-hand side.

The synchronous motor comprises a stationary rotary-current winding 6 around which is disposed the armature 7 with the direct-current winding 8. The asynchronous motor has a stator 9 like that of the synchronous motor. The armature 10 is a short-circuit armature of the usual type. The armatures 7 and 10 are rigidly secured to the gyrating element 2.

In the arrangement of motors just described it is only necessary to supply current to the direct-current winding 8 of the rotor 7 of the synchronous motor, this being done as follows: Clamp terminals 11 are disposed on the exterior of the casing at both ends of the spindle 4 and are carried on caps 12 of insulating material. Metal sleeves 13 covered outside by covers 14 are mounted in the caps 12. The sleeves 13 carry axially movable contact pins 15 in the rear hollow end of which is disposed a spring 16 abutting on the cover 14 and pressing the pins 15 inwardly against rod-like conductors 17 mounted in insulating tubes 18 in the spindle 4. The rods 17 extend to the centre of the gyrating element 2 where they are flattened on one side and separated by a Z-shaped insulating piece 19. Additional conductor rods 20 are disposed in radial bores in the central web or partition 5 and abut outwardly on insulating blocks 21 of pressure-resisting material such as, for example, agate. These blocks 21 are held in metal mounts 22 secured in position from outside with the aid of screw-bolts 23 which are prevented from falling out by set screws 24. A connection 25 leads from the outer end of the rods 20 to the winding 8, care being taken to provide means (not shown) whereby these connections are not destroyed or displaced by centrifugal force.

The gyroscope drive just described works as follows: The gyroscope at rest is set in operation by first starting it with the aid of the asynchronous motor 9, 10. The synchronous motor is likewise energized but does not co-operate until synchronism between the rotary field and angular velocity of the gyrating element is reached. When such is the case (as may be easily determined from the known R. P. M. of the generator) the asynchronous motor is automatically thrown out of operation, as it can produce a torque only when there is a certain slip between stator and rotor.

Figure 2:
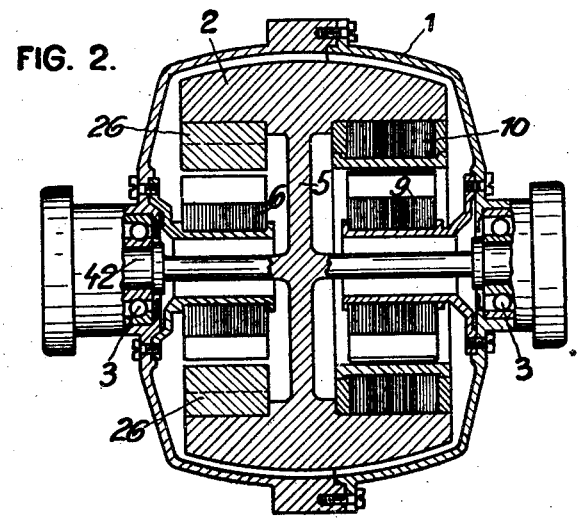
Fig. 2, is a similar elevation showing a modification in which the synchronous motor is provided with a set of permanent magnets.

The modification shown in Fig. 2 is similar to the one shown in Fig. 1, and the same letters of reference have been used to indicate corresponding parts. However, the synchronous motor is provided with permanent field magnets. Thus the current-conducting elements 17 and 20 and the associated parts are dispensed with, and accordingly the gyratory member 2 is provided with a solid shaft 42. The synchronous motor comprises the stationary alternating-current winding 6 around which permanent magnets 26 are disposed in the gyrating element 2. The asynchronous motor has a similar stator 9 and a short-circuit, armature 10 of the usual type. In the foregoing description the same reference numerals as in the prior specification have been used as much as possible. The drive works exactly as in the prior invention.

Should the intensity of the field of the permanent magnets be weakened by the alternating field of the stator, the intensity of the field can be fully restored by supplying the stator with direct current for a short time when the apparatus is at rest.

In the modification shown in Figs. 3 and 4 the gyroscope comprises a casing 1, a gyroscopic member 2 and its shaft 43 mounted in anti-friction bearings 3. As shown the body 2, its web 5 and the shaft 43 are made integral. In the left-hand recess of the body 2 there is the synchronous motor, while the asynchronous motor is disposed in the right-hand recess. The synchronous motor is provided with a stationary winding 6, such for example as a rotary-current winding, and the permanent magnet 263 is disposed concentrically within the said winding. The asynchronous motor comprises a stator 93 and a rotor 103 enclosing the same. The stator 6 of the synchronous motor is mounted on a flange 27 made integral with the casing 1 and projecting therefrom into the left-hand recess of the body 2. The stator 93 of the asynchronous motor is mounted on a sleeve 28 made integral with the right-hand wall of the casing 1.

The permanent magnet 263 is provided with a ring 29 of soft iron by means of which the poles N and S of the permanent magnet are short-circuited. Therefore, the lines of force of the permanent magnet can not pass into the stator. But the rotor remains polarized so that the motor is always operative.

In the modification shown in Figs. 5 and 6 the gyratory body 200 is formed with a single recess extending from one end to the other, and the web 55 is located at one end of the said body. The body 200 encloses a magnet 30 the poles of which are connected by a ring 31 of soft iron which is formed internally with slots 310 in which the bars 32 of the armature of the asynchronous motor are embedded. Further, the object of the said ring is to provide a magnetic connection for the poles of the magnet. On a sleeve 285 fixed to the left-hand end wall of the casing 1 the stator 95 is mounted. In the construction shown in these figures the synchronous motor and the asynchronous motor are combined, the asynchronous motor comprising the parts 95, 31 and 32, and the synchronous motor the parts 95, 30 and 31. The operation of the apparatus is the same as has been described with reference to Figs. 1 to 4.

By connecting the poles of the armature of the synchronous motor, as by means of the soft iron rings 29 and 31, an almost apolar armature is produced. The lines of force of the permanent magnets consequently tend to pass through the iron rings and not through the air gap between the stator and rotor. However, the poles remain perceptible at those points where the magnet contacts the iron ring, i. e. a rather small number of lines of force still pass through the air gap.

All of the gyroscopes above described may be so operated that the asynchronous motor is driven at higher frequency than that of the synchronous motor. The latter is in this way relieved of the load and operates merely to correct the slip of the asynchronous motor, so that the synchronous motor more effectively maintains its rotation synchronously of its rotary field.

I claim:

1. A gyroscope, comprising a gyratory body, and a synchronous motor for driving the same, the armature of said synchronous motor having polar regions of lower magnetic resistance than the intervening portions of said armature.

2. A gyroscope, comprising a gyratory body, and a synchronous motor and an asynchronous motor for driving the same, the armature of said synchronous motor having polar regions of lower magnetic resistance than the intervening portions of said armature.

3. A gyroscope, comprising a gyratory body formed with recesses, and a synchronous motor and an asynchronous motor disposed in said recesses, the armature of said synchronous motor having polar regions of lower magnetic resistance than the intervening portions of said armature.

4. A gyroscope, comprising a gyratory body, and a synchronous motor for driving the same, the poles of the rotor of said synchronous motor being connected by a body of soft iron.

5. A gyroscope, comprising a gyratory body, a synchronous motor for driving the same, the poles of the rotor of said synchronous motor being connected by a ring of soft iron, and an electrically energized stator disposed within said ring.

6. A gyroscope, comprising a gyratory body, a synchronous motor for driving the same, the poles of the rotor of said synchronous motor being connected by a ring of soft iron and an electrically energized stator disposed within said ring, said ring being provided at one side with bars forming the armature of an asynchronous motor.

In testimony whereof I have affixed my signature.

JOHANN-MARIA BOYKOW.